Patented Apr. 7, 1936

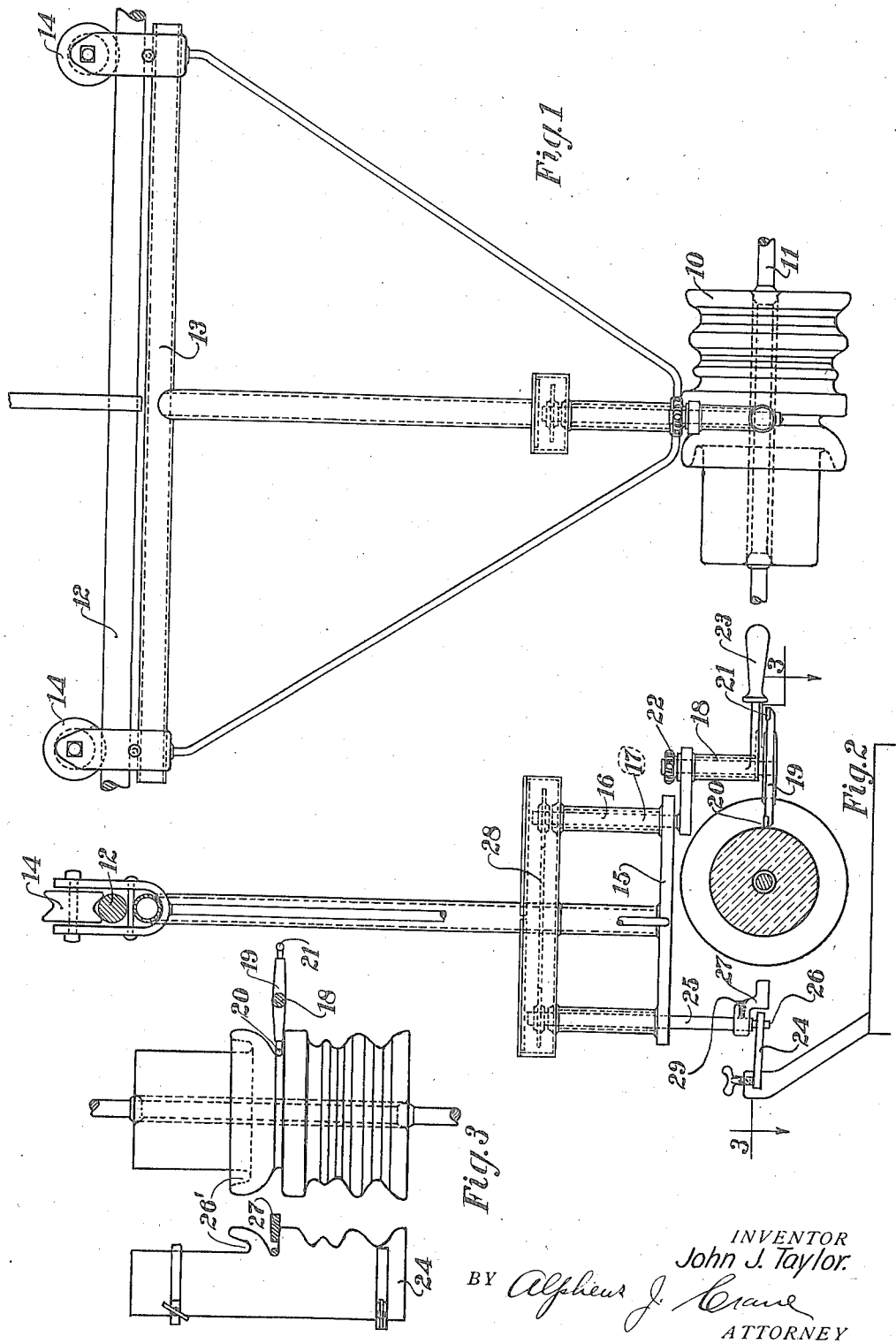

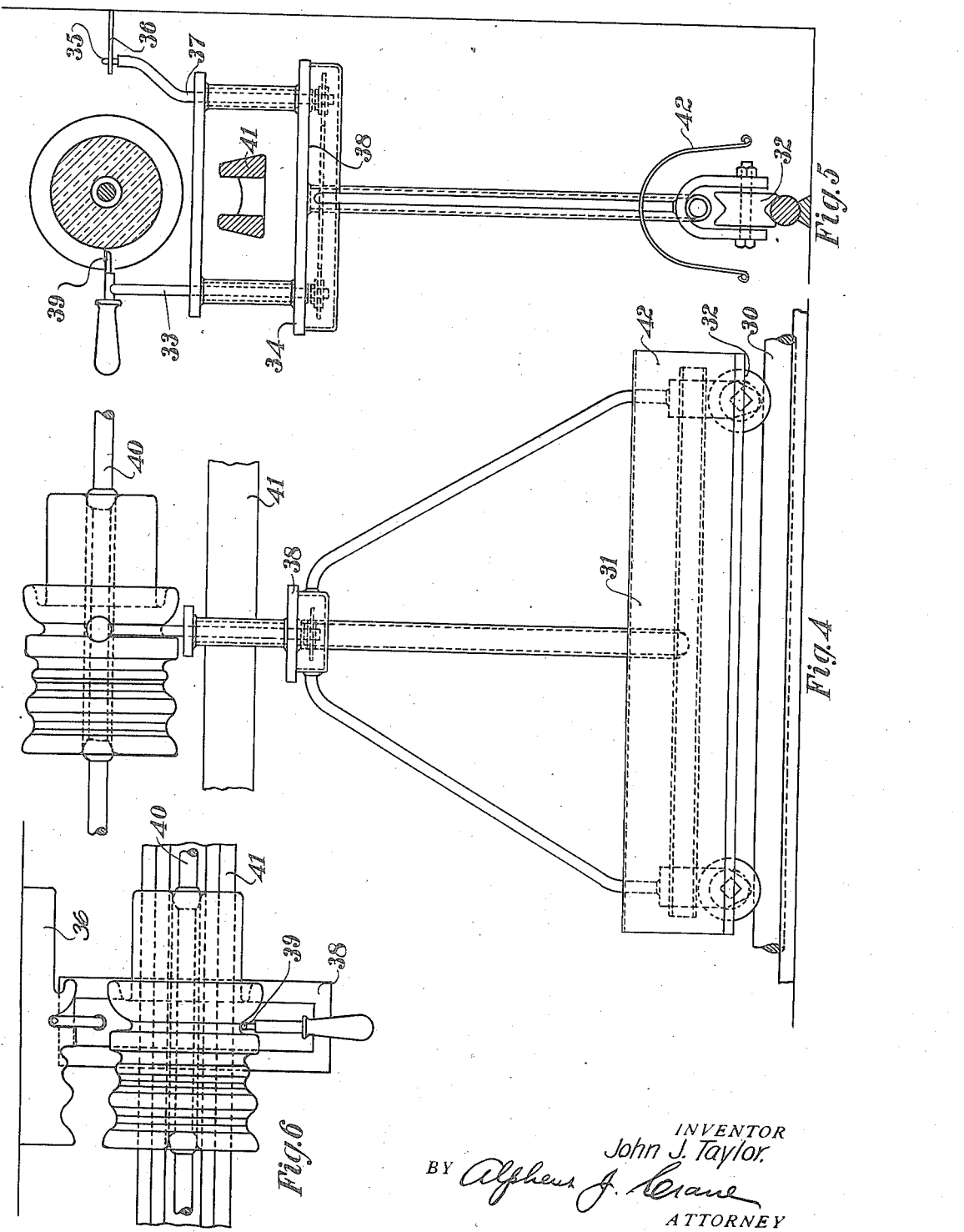

2,036,241

UNITED STATES PATENT OFFICE 2,036,241

TRIMMER

John J. Taylor, Barberton, Ohio, assignor to The Ohio Brass Company, Mansfield, Ohio, a corporation of New Jersey Application February 20, 1933, Serial No. 657,620

22 Claims. (Cl. 142—7)

This invention relates to trimmers, especially adapted for finishing the surface of articles made of clay or other material to impart a desired contour to the surface.

One object of the invention is to provide a support for a trimming tool which will permit the tool to be accurately guided by a template.

Another object of the invention is to provide means for preventing injury to the surface of the work.

Other objects and advantages will appear from the following description.

The invention is exemplified by the combination and arrangement of parts shown in the accompanying drawings and described in the following specification, and it is more particularly pointed out in the appended claims.

In the drawings:

Fig. 1 is an elevation of a trimmer embodying one form of the invention.

Fig. 2 is an end view of the device shown in Fig. 1 with parts in section.

Fig. 3 is a section approximately on line 3—3 of Fig. 2.

Figs. 4, 5 and 6 are views similars to Figs. 1, 2 and 3 respectively but showing a modified form of the invention.

In the formation of clay or porcelain articles, such as bushing insulators, having surfaces of revolution, blanks for the articles are sometimes molded or otherwise formed to approximately the desired shape, and the surfaces are then finished by a turning operation after the clay has been dried but before it is fired. It is frequently desirable to impart to the outer surface a contour which cannot be formed by a molding process as the electrical conditions to which the insulator is subjected require flanges of various and, sometimes, rather intricate formation. The present invention provides a trimmer which employs a template for guiding the trimmer tool to impart to the work the desired contour.

In the form of the invention shown in Fig. 1, the numeral 10 designates an unfired porcelain bushing insulator constituting the piece of work to be trimmed. It will be understood, of course, that the device may be used on a large variety of work pieces and is applicable to a large variety of materials other than that shown. The work is carried by a spindle 11 which is supported and driven in any well-known manner. Above the spindle 11 is a cylindrical rod 12 constituting a track upon which a carriage 13 is supported by rollers or groove pulleys 14 mounted to travel along the track. This form of support not only permits the carriage to travel longitudinally of the track, but also permits it to swing transversely about the track as an axis. Supported at the lower end of the carriage 13 is a cross head or bar 15, supporting a journal 16 in which a spindle 17 is mounted to rotate. The spindle 17 carries an offset tool support 18 having a cross bar or tool shank 19 at its lower end. Cutting tools 20 and 21 are carried at the opposite ends respectively by the cross bar 19 and the support 18 may be rotated to bring either the tool 20 or 21 into operative position. A hand nut 22 or other suitable device is employed for locking the tool in either of its two operating positions.

The tools 20 and 21 have circular cutting edges, as shown in Fig. 3; the tools having different diameters to adapt them for different contours. The tool that is in operative position will have the center of its cutting edge in alinement with the axis of the spindle 17 so that rotation of the tool support on the spindle 17 will not change the relation of the cutting edge to the work, but merely permit the tool support to be swung into various positions so that the cutting tool may be projected into recesses in the surface of the work. The tool carrier is provided with a handle 23 to permit easy manipulation of the tool. The cross head 15 is guided by a template 24 having its edge shaped to impart to the work the desired contour. A spindle 25 is mounted in the cross head 15 and carries a contact finger 26 for engaging the template. The contact finger preferably has the same radius as the cutting tool guided thereby. As the carriage is moved by the operator along the track 12 to bring the cutting tool to various positions along the work, the cross head 15 will be swung in and out about the axis of the track 12, guided by the template 24, so that the surface of the work will take the contour of the template. The workman can swing the tool about the axis of the spindle 17 so as to extend the tool into any laterally extending recesses, as that indicated at 26' in Fig. 3. The position of the cutting head will be determined by the template, irrespective of the angular position of the tool handle about the axis 17. However, it is desirable to prevent the cross bar 19 from being swung into contact with the surface of the work. Of course the workman, by watching the cross bar 19, can guide his tool to prevent the occurrence of such contact, which might mar the finished surface. However, means are provided which operates automatically to limit the movement of the tool and to prevent its contact with the finished surface. For this purpose, a stop 27 is secured to the spindle 25 and extends laterally relative to the spindle in a position corresponding to the position of the shank 19 relative to the tool support 17. The spindles 17 and 25 are geared together by any suitable means, such as a chain 28, so that when the tool support is rotated about the spindle 17, the stop 27 will be correspondingly rotated about the spindle 25. The stop 27 may be made slightly thicker, horizontally, than the shank 19 so that the stop will engage any projection on the template just before the tool shank 19 would engage the corresponding projection on the work. In this way the tool shank 19 is automatically prevented from contacting the finished surface of the work.

The stop 27 is preferably adjustably secured to the spindle 25 by means of a screw 29 or other suitable device so that it can be set in the proper position and so that it may also be raised upon the spindle 25 to remove it from operative position. In some cases where there are no deep grooves or other complicated formations on the surface of the work, the stop will not be necessary and might somewhat hinder the speed of operation. The carriage, mounted to travel on a track parallel with the axis of the work and to swing laterally about the track as an axis of oscillation with the template arranged substantially the same distance from the track as the cutting tool, guides the tool accurately so that the work will be given the contour of the template without deformation or distortion. The form of mounting also provides a support for the tool which is easily moved by the workman to follow the contour of the template.

A supporting track may be placed below the work and the carriage may be mounted to rest upon the track rather than to swing below it. Such an arrangement has the advantage that it leaves the space above the work entirely open, giving a more unobstructed view of the work and template than where the tool is suspended from an over-head track. An arrangement of this kind is shown in Figs. 4, 5 and 6 in which the numeral 30 designates a track rod having a carriage 31 mounted to travel thereon and supported by grooved wheels or pulleys 32 so that the carriage may travel along the track and swing transversely about the axis of the track. A tool spindle 33 is journaled in a cross head 34 and the guide finger 35, for engaging the template 36, is carried by a spindle 37, also journaled in the cross head 34. The two spindles 33 and 37 are geared together by a chain 38. In this case, the cutting knife 39 is not arranged in alinement with the spindle 33 as in the form shown in Figs. 1, 2 and 3, but is offset relative to the axis of the spindle 33. In order that this offset relation may not affect the contour of the work, the guide finger 35 is offset relative to the axis of its spindle 37 an equal amount. Since the two spindles are geared together to rotate in unison, this will enable the cutting tool 39 to be guided accurately by the finger 35, so that the contour of the work will correspond to the contour of the template. The work may be supported in any suitable way, as by a spindle 40, having suitable journaled bearings and driving mechanism mounted on a lathe bed 41. The carriage and track may be shielded from trimmings by means of a shield 42.

I claim:

1. A trimmer comprising a spindle for supporting a work piece, a track rod spaced vertically from said spindle and disposed parallel to said spindle, a carriage having grooved pulleys engaging said track rod, said carriage being supported by said pulleys to travel along said track rod and to swing transversely of said spindle about said track rod as an axis, a tool carrier comprising a rotatable tool spindle journaled on said carriage, a shank secured to said tool spindle and extending transversely thereof, a tool having a circular cutting edge carried by one end of said shank, and a handle secured to said shank for guiding said tool.

2. A trimmer comprising a spindle for supporting a work piece, a tool carrier mounted to travel longitudinally of said spindle and to move transversely thereof, a tool supporting rotatable spindle mounted on said tool carrier at one side of said work spindle, a tool mounted on said tool spindle, a template for guiding said tool disposed at the opposite side of said work spindle from said tool, a guide spindle mounted in said tool carrier and having a contact member for engaging said template, and means for constraining said tool spindle and guide spindle to rotate in unison with each other about their respective axes.

3. A trimmer comprising a work spindle, a tool support mounted to move longitudinally and transversely of said work spindle, a rotatable tool spindle journaled on said tool support, a rotatable guide spindle journaled on said tool support in parallel relation to said tool spindle, a tool carried by said tool spindle, a guide carried by said guide spindle, a template engaged by said guide, said tool and guide being disposed in like relation to the axes of their respective spindles, and means for constraining said tool spindle and guide spindle to rotate in unison with each other.

4. A trimmer comprising a work spindle, a tool carrier mounted to travel longitudinally and to move transversely of said work spindle, a rotatable tool spindle journaled on said tool carrier and having its axis of rotation disposed in a plane normal to the axis of said work spindle, and a tool having a circular cutting edge supported by said tool spindle, the center of said circular cutting edge being disposed in alinement with the axis of said tool spindle.

5. A trimmer comprising a work spindle, a tool carrier mounted to move longitudinally and transversely of said work spindle, a tool spindle journaled in said carrier, a tool mounted on said tool spindle and having a circular cutting edge, the center of said circular edge being disposed in alinement with the axis of said tool spindle, a guide spindle journaled in said tool support in spaced parallel relation to said tool spindle, a guide mounted on said guide spindle having a circular contact surface, the center of which is in alinement with the axis of said guide spindle, and a template for engaging said guide.

6. A trimmer comprising a work spindle, a tool carrier mounted to move longitudinally and transversely of said work spindle, a rotatable tool spindle journaled in said tool carrier, a tool mounted on said spindle and having its cutting edge disposed at one side of the axis of said tool spindle, a rotatable guide spindle mounted on said tool carrier in spaced parallel relation to said tool spindle, a guide carried by said guide spindle and having a guiding face disposed in offset relation to the axis of said guide spindle an amount equal to the amount the cutting edge of said tool is offset relative to the axis of said tool spindle, and means for constraining said guide spindle and said tool spindle to rotate in unison with each other.

7. A trimmer comprising a work spindle, a cylindrical track rod mounted in spaced parallel relation to said work spindle, a carriage having guide rollers engaging said track rod and supporting said carriage for movement along said track rod in the direction of the axis of said work spindle and for movement about said track rod as an axis transversely to the axis of said work spindle, a rotatable tool spindle journaled in said carriage, a tool mounted on said tool spindle, a rotatable guide spindle journaled in said carriage in parallel spaced relation to said tool spindle, a guide carried by said guide spindle, a template engaged by said guide, said tool and guide being disposed in similar positions relative to the axes of their respective spindles, and means for constraining said tool and guide spindles to rotate in unison with each other.

8. A trimmer comprising a work spindle, a guide rod disposed below said work spindle, a carriage having rollers mounted on said guide rod, said carriage being movable transversely of said work spindle about said guide rod as an axis, a cutter carried by said carriage and a shield disposed over said rollers and guide rod for protecting said rollers and guide rod from trimmings falling from work on said spindle.

9. A trimmer comprising a work spindle, a carriage movable longitudinally and transversely of said spindle, a tool mounted on said carriage for engaging work on said spindle, a template for guiding said tool, a rotatable spindle for supporting said tool on said carriage, a guide for engaging said template, a rotatable spindle for supporting said guide on said carriage, means for constraining said tool and guide spindles to rotate in unison with each other, and a stop carried by said guide spindle for limiting the rotation of said tool about its spindle.

10. A trimmer comprising a work spindle, a tool support mounted to move longitudinally and transversely of said work spindle, a rotatable tool spindle journaled in said tool support, a shank mounted on said tool spindle, a tool carried by said shank, a rotatable guide spindle mounted on said tool support, a guide carried by said guide spindle, a template for engaging said guide, means for constraining said guide spindle and said tool spindle to rotate in unison with each other, and a stop carried by said guide spindle and adapted to engage said template to limit rotation of said tool about said tool spindle to prevent said shank from engaging the finished surface of the work carried by said work spindle.

11. A trimmer comprising a work spindle, a carriage mounted to move longitudinally and transversely of said spindle, a tool having a circular cutting edge mounted on said carriage, a shank for said tool extending away from the cutting edge thereof, and means for supporting said shank for pivotal movement about an axis extending through the center of the arc formed by said cutting edge and normal to the plane of said arc.

12. A trimmer comprising a work spindle, a tool comprising a shank having an arcuate cutting edge at one end thereof, and means for supporting said shank to swing about an axis of rotation extending through the center of the arc formed by the cutting edge of said tool and normal to the plane of said arc, the axis of said shank being transverse to said axis of rotation.

13. A trimmer comprising a work spindle, a carriage movable longitudinally and transversely of said work spindle, a tool spindle journalled in said carriage, a tool having a shank carried by said spindle and extending in a direction transverse to the axis of said spindle and having an arcuate cutting edge at one end of said shank disposed in a plane normal to the axis of said tool spindle, the center of the arc formed by said cutting edge lying in the axis of said tool spindle.

14. A trimmer comprising a work spindle, a carriage movable longitudinally and transversely of said work spindle, a template for guiding said carriage, means on said carriage for engaging said template, a tool spindle journalled on said carriage, an offset bracket carried by said tool spindle, a tool mounted on said bracket and comprising a shank and an arcuate cutting edge, the arc formed by said cutting edge being disposed in a plane normal to the axis of said tool spindle and having the center of the arc formed by said edge lying in the axis of said tool spindle extended.

15. A trimmer comprising a spindle for supporting a work piece, a tool carrier mounted to travel longitudinally of said spindle and to move transversely thereof, a rotatable tool supporting spindle mounted on said tool carriage at one side of said work spindle, a tool mounted on said tool spindle, a template for guiding said tool disposed at the opposite side of said work spindle from said tool, a rotatable guide spindle mounted on said tool carrier and having a contact member for engaging said template, a stop secured to said guide spindle for limiting rotation thereof, and means for constraining said tool spindle and guide spindle to rotate in unison with each other about their respective axes.

16. A trimmer comprising a work spindle, a tool support mounted to move longitudinally and transversely of said work spindle, a rotatable tool spindle journalled on said tool support, a rotatable guide spindle journalled on said tool support in parallel relation to said tool spindle, a tool carried by said tool spindle and having a cutting edge disposed at one side of the axis of said tool spindle, a template for controlling the movement of said tool support, a guide mounted on said guide spindle and having a contact portion offset relative to the axis of said guide spindle, the cutting edge of said tool and the contact portion of said guide being disposed in like relation to the axes of their respective spindles, and means for constraining said tool spindle and guide spindle to rotate in unison with each other.

17. A trimmer comprising a work spindle, a tool carrier mounted to move longitudinally and transversely of said work spindle, a tool spindle journalled on said carrier, a tool mounted on said tool spindle and having a circular cutting edge, the plane of said cutting edge being normal to the axis of said tool spindle and the center of said cutting edge being disposed in alinement with the axis of said tool spindle, a guide having a cylindrical contact surface mounted on said tool carrier in spaced relation to said tool spindle, the axis of said contact surface being parallel to the axis of said tool spindle, and a template for engaging said guide.

18. A trimmer comprising a work spindle, a cylindrical track rod mounted in spaced parallel relation to said work spindle, a carriage having guide rollers engaging said track rod and supporting said carriage for movement along said track rod in the direction of the axis of said work spindle and for movement transversely to the axis of said work spindle and about said track rod as an axis, a rotatable tool spindle journalled on said carriage, a tool mounted on said tool spindle and having its cutting edge disposed at one side of the axis of said tool spindle, a rotatable guide spindle journalled on said carriage in parallel spaced relation to said tool spindle, a guide carried by said guide spindle and having a contact face disposed in offset relation to the axis of said guide spindle corresponding to the position of said cutting edge relative to the axis of said tool spindle, a template for engaging said guide, and means for constraining said tool and guide spindles to rotate in unison with each other.

19. A trimmer comprising a work spindle, a tool support adjacent said work spindle, a tool spindle journalled in said tool support and having its axis arranged transversely of said work spindle but spaced therefrom, a tool shank carried by said tool spindle and having an arcuate cutting edge at one end of said shank disposed in a plane normal to the axis of said tool spindle, the center of the arc formed by said cutting edge lying in the axis of said tool spindle, the plane of said cutting edge being spaced from the end of said tool spindle, said shank being connected to said tool spindle by an arm radially offset from the axis of said tool spindle.

20. A trimmer comprising a work spindle, a tool shank having an arcuate cutting edge at one end thereof, means for supporting said shank to swing about an axis of rotation extending through the center of the arc formed by the cutting edge of said tool and normal to the plane of said arc, the radial distance of said cutting edge from said axis remaining constant when said shank is swung about said axis, the axis of said shank being transverse to said axis of rotation and means for holding said shank and cutting edge stationary in the different angular positions of adjustment about said axis of rotation with said cutting edge in engagement with a work piece carried by said work spindle to permit said cutting edge to sever material from said work piece when said work piece is rotated by said work spindle to move the periphery of said work piece in a direction transverse to said cutting edge.

21. A trimmer comprising a work spindle, a tool support adjacent said work spindle, a tool spindle journalled in said tool support and having its axis arranged transversely of the axis of said work spindle but spaced therefrom, a tool shank carried by said tool spindle and having an arcuate cutting edge at one end thereof disposed in a plane normal to the axis of said tool spindle, the center of the arc formed by said cutting edge lying in the axis of said tool spindle, the plane of the cutting edge of said tool being spaced from the end of said tool spindle, said tool shank being connected to said tool spindle by an arm radially offset from the axis of said tool spindle, and a handle secured to said shank to hold said shank and said cutting edge in various angular positions of adjustment about the axis of said tool spindle while said cutting edge engages rotating work on said work spindle.

22. In a trimmer a tool comprising a shank having an arcuate cutting edge at one end thereof, means for supporting said shank to swing about an axis fixed relative to said shank and extending transversely of said shank through the center of the arc formed by said cutting edge, means for supporting a work piece and for moving the surface thereof across said cutting edge transversely of the plane of said cutting edge, the support for said shank at one side of the plane of said cutting edge and adjacent to said plane being offset from the axis of rotation of said shank.

JOHN J. TAYLOR.